United States Patent
Hsieh et al.

(10) Patent No.: US 8,374,741 B2
(45) Date of Patent: Feb. 12, 2013

(54) SECTIONAL ELECTRIC DRIVE VEHICLE

(75) Inventors: Chung-Jen Hsieh, Taipei Hsien (TW);
Ming-Shiu Ou Yang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 364 days.

(21) Appl. No.: 12/825,542

(22) Filed: Jun. 29, 2010

(65) Prior Publication Data

US 2011/0282528 A1    Nov. 17, 2011

(30) Foreign Application Priority Data

May 13, 2010   (TW) ................ 99115227 A

(51) Int. Cl.
*B60L 9/00* (2006.01)
*B60L 11/00* (2006.01)
(52) U.S. Cl. ........................................ 701/22
(58) Field of Classification Search ............. 701/22
See application file for complete search history.

(56) References Cited

U.S. PATENT DOCUMENTS 4,221,276 A * 9/1980 Mitchell et al. ............ 180/209
4,580,652 A * 4/1986 Turner et al. ............... 180/210

* cited by examiner

*Primary Examiner* — James Trammell
*Assistant Examiner* — Michael D Lang
(74) *Attorney, Agent, or Firm* — Altis Law Group, Inc.

(57) ABSTRACT

A sectional electric drive vehicle includes a first motorcycle having a master electric control unit, a second motorcycle detachably connected to the first motorcycle in tandem by a connection mechanism and the second motorcycle including a slave electric control unit, and a system connector detachably connecting the master electric control unit and the slave electric control unit, to allow signals transmission between the master and slave electric control units. When the first and second motorcycles are combined and connected together via the connection mechanism and the system connector, the slave electric control unit relinquishes control to the master electric control unit, and the master electric control unit controls the cooperative motion of the first and second motorcycles. When the first and second motorcycles are detached, the first and second motorcycles are independently operable.

19 Claims, 6 Drawing Sheets

SECTIONAL ELECTRIC DRIVE VEHICLE

BACKGROUND

1. Technical Field

The present disclosure generally relates to electric drive vehicles, and particularly, to a sectional electric drive vehicle.

2. Description of Related Art

Recently, despite convenience of accessible automobiles for transport, problems such as air pollution, noise emission, traffic congestion, and inadequate parking space are exacerbated. Compared with automobiles, an electric motorcycle requires a minimal parking space and produces considerably less emissions. However, use of the two-wheel electric motorcycle entails exposure to the elements, relatively low safety levels and only limited cargo carrying capability.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
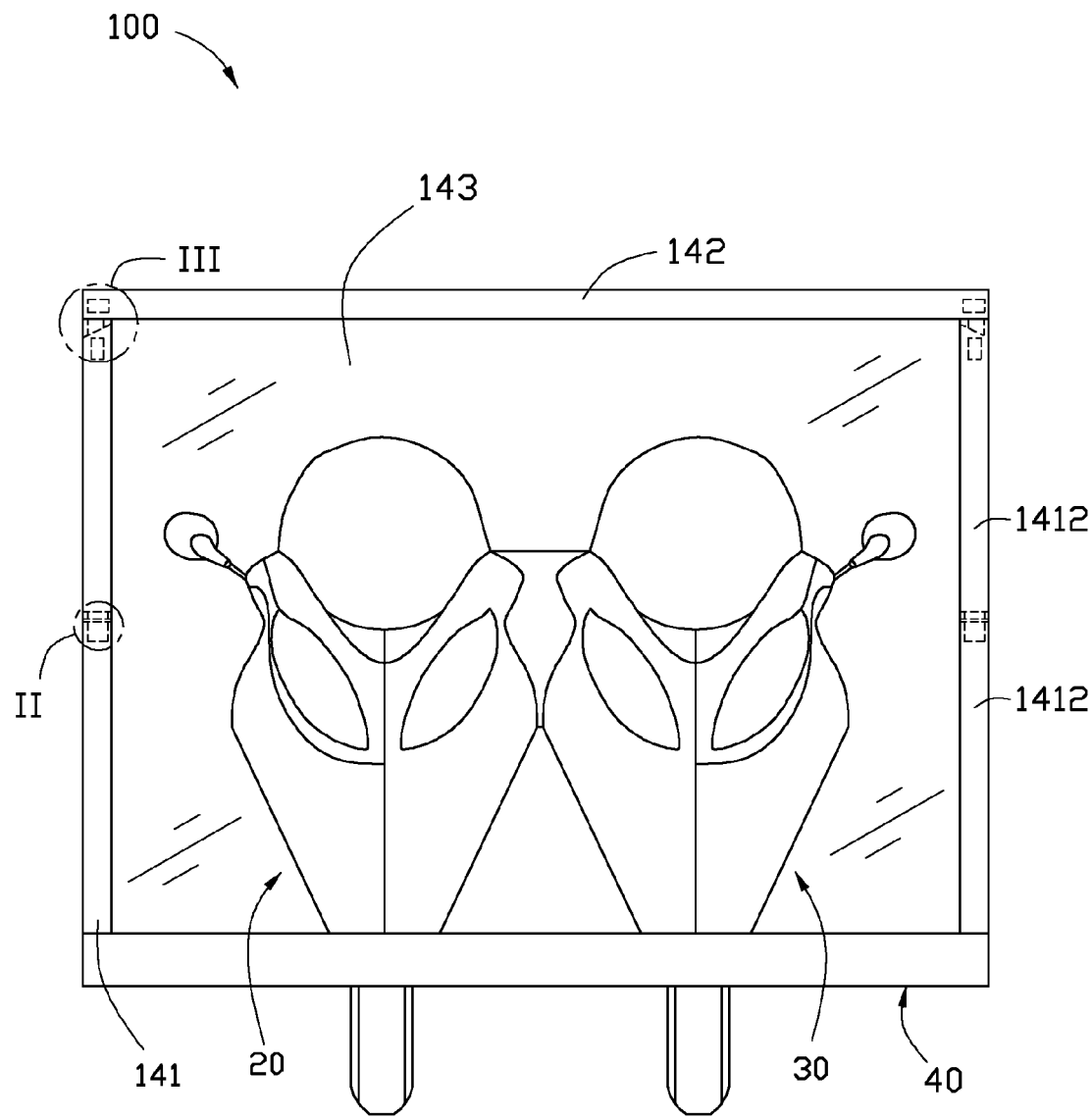
FIG. 1 is a front view of a first embodiment of a sectional electric drive vehicle.
Figure 4:
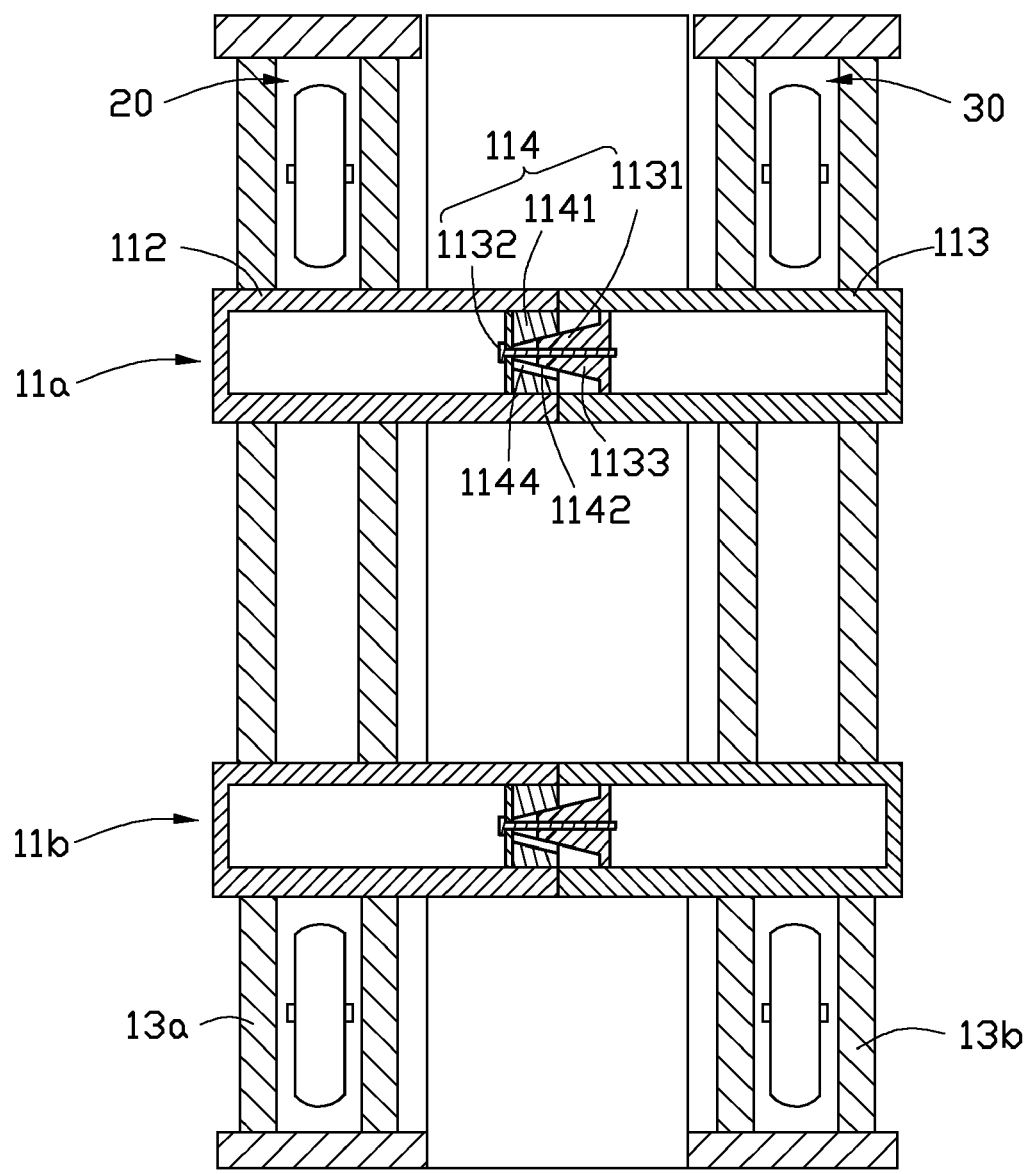
FIG. 4 is a cross-section of the sectional electric drive vehicle of FIG. 1, showing a connection mechanism detachably connecting first and second motorcycles.

Referring to FIGS. 1 and 4, a first embodiment of a sectional electric drive vehicle 100 includes a first motorcycle 20 and a second motorcycle 30, which are detachably connected side by side. When the first and second motorcycles 20, 30 are combined and connected together, the sectional electric drive vehicle 100 can function as a four-wheeled vehicle, and when detached, the first and second motorcycles 20, 30 are capable of being operated independently.

The first and second motorcycles 20, 30 are connected via a connection mechanism 40 therebetween. The connection mechanism 40 includes a front beam 11a and a rear beam 11b which are parallel to each other. Each of the front and rear beams 11a, 11b includes a first bar 112 with one end of the first bar 112 connected to the first motorcycle 20, a second bar 113 with one end of the second bar 113 connected to the second motorcycle 30, and a locking assembly 114 detachably connecting the opposite ends of the first and second bars 112, 113.

In the first embodiment, the locking assembly 114 includes a first connection member 1141 fixed to the first bar 112, a second connection member 1131 fixed to the second bar 113, and a bolt 1132 passing through the first connection member 1141 and threaded into the second connection member 1131. The first connection member 1141 defines a tapered hole 1142 extending along a longitudinal axis thereof. The second connection member 1131 forms a tapered protrusion 1133 received in the tapered hole 1142. The first connection member 1141 defines a plurality of slots 1144 extending from an end along a longitudinal axis thereof.

Because the slots 1144 provide deformation capability, the first connection member 1141 can generate elastic deformation when the tapered protrusion 1133 is received in the tapered hole 1142 and drawn by the bolt 1132, such that the first and second connection members 1131, 1141 can be stably securely connected.

The sectional electric drive vehicle 100 further comprises a left beam 13a and a right beam 13b parallel thereto, and the left beam 13a and the right beam 13b are substantially perpendicular to the front and rear beams 11a, 11b. The front beam 11a, the rear beam 11b, the left beam 13a, and the right beam 13b cooperatively form a chassis base (not labeled). A bottom plate can be attached to the chassis base to support a plurality of passengers or other objects.

Figure 2:
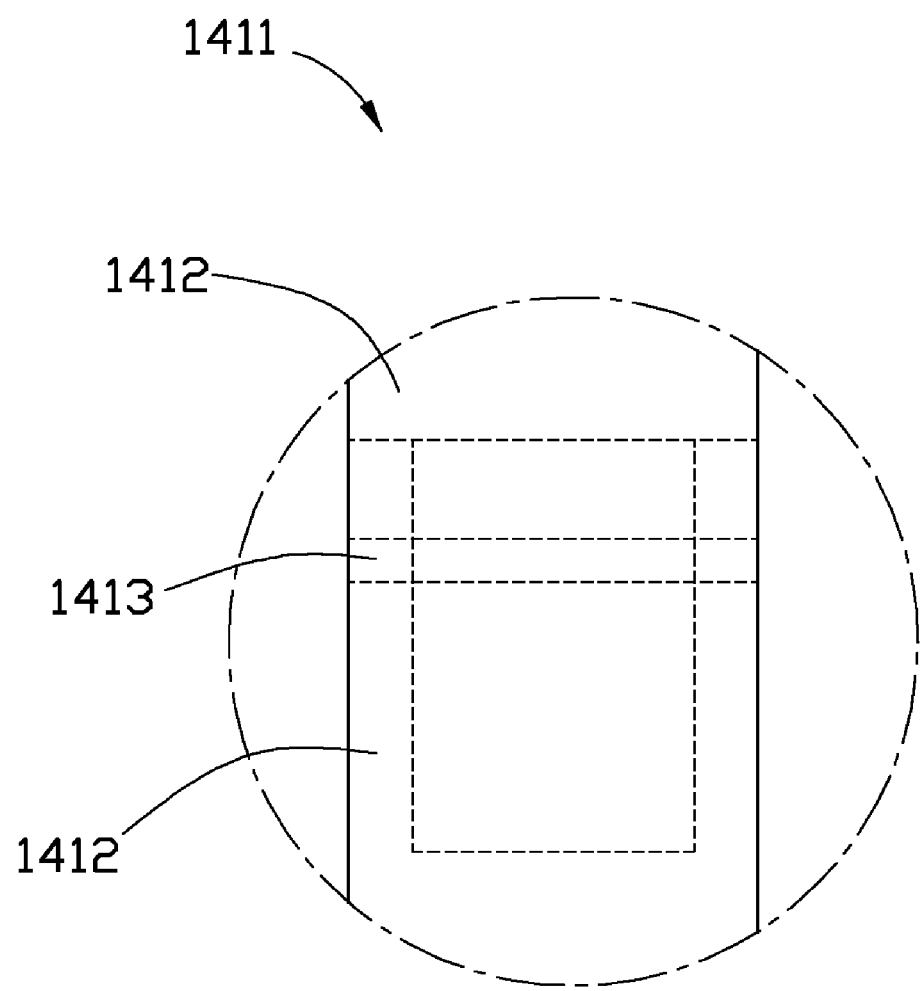
FIG. 2 is an enlarged, partial view of a support assembly identified by circle II in FIG. 1.
Figure 3:
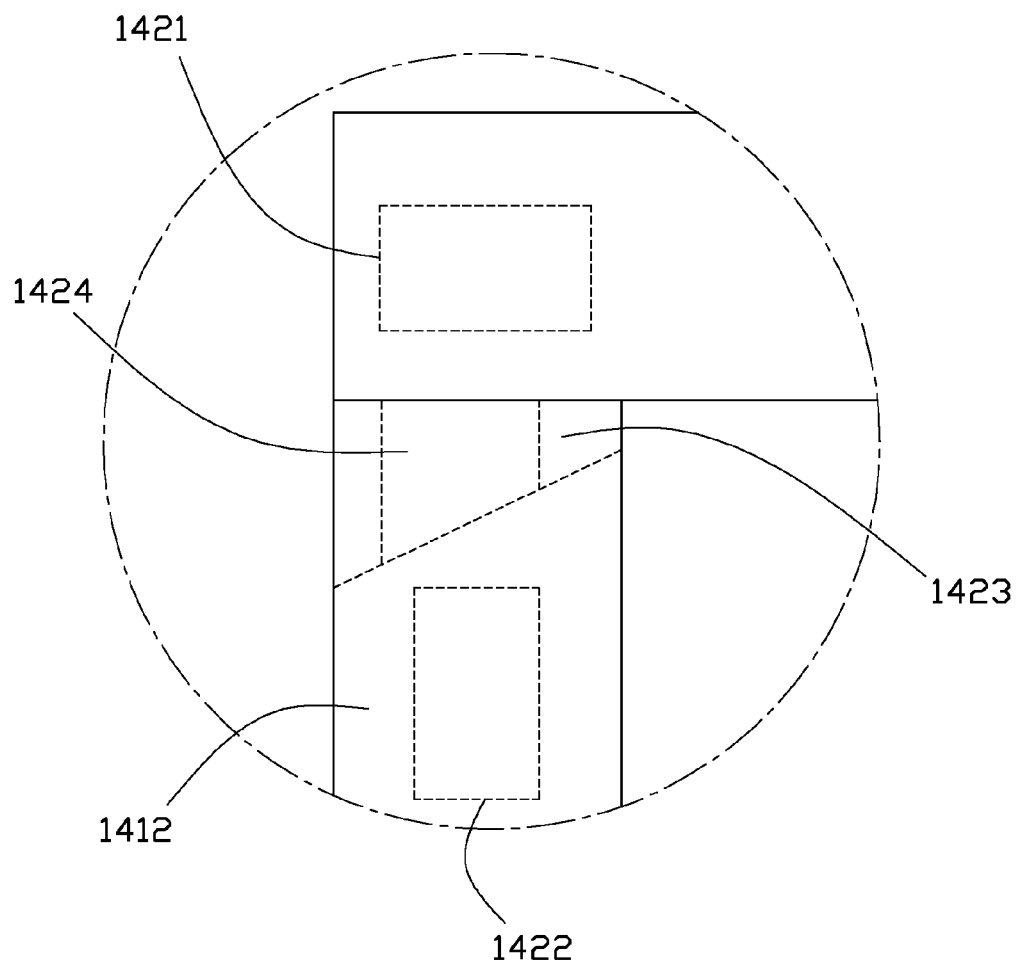
FIG. 3 is an enlarged, partial view of a covering assembly and body assembly identified by circle III in FIG. 1.

Referring to FIG. 1 through 3, the sectional electric drive vehicle 100 further includes a covering assembly 142, and a body assembly 143 provided with a support frame assembly 141. The support frame assembly 141 includes four support bars 1411 positioned on four corners of the chassis base. Each support bar 1411 includes two threaded tubes 1412 and a bolt 1413 received in and locking the two threaded tubes 1412 together.

The covering assembly 142 includes a first magnet 1421, and the body assembly 143 includes a second magnet 1422 attracted by the first magnet 1421, thereby connecting the covering assembly 142 and the body assembly 143 via magnetic force. The first and second magnets 1421, 1422 can be neodymium magnets. The contacting surfaces of the covering assembly 142 and the body assembly 143 cooperatively define a gap 1423 therebetween, and a separating member 1424 is capable of being received in the gap 1423 to obstruct the magnetic field between the first and second magnets 1421, 1422, thus facilitating detachment.

Figure 5:
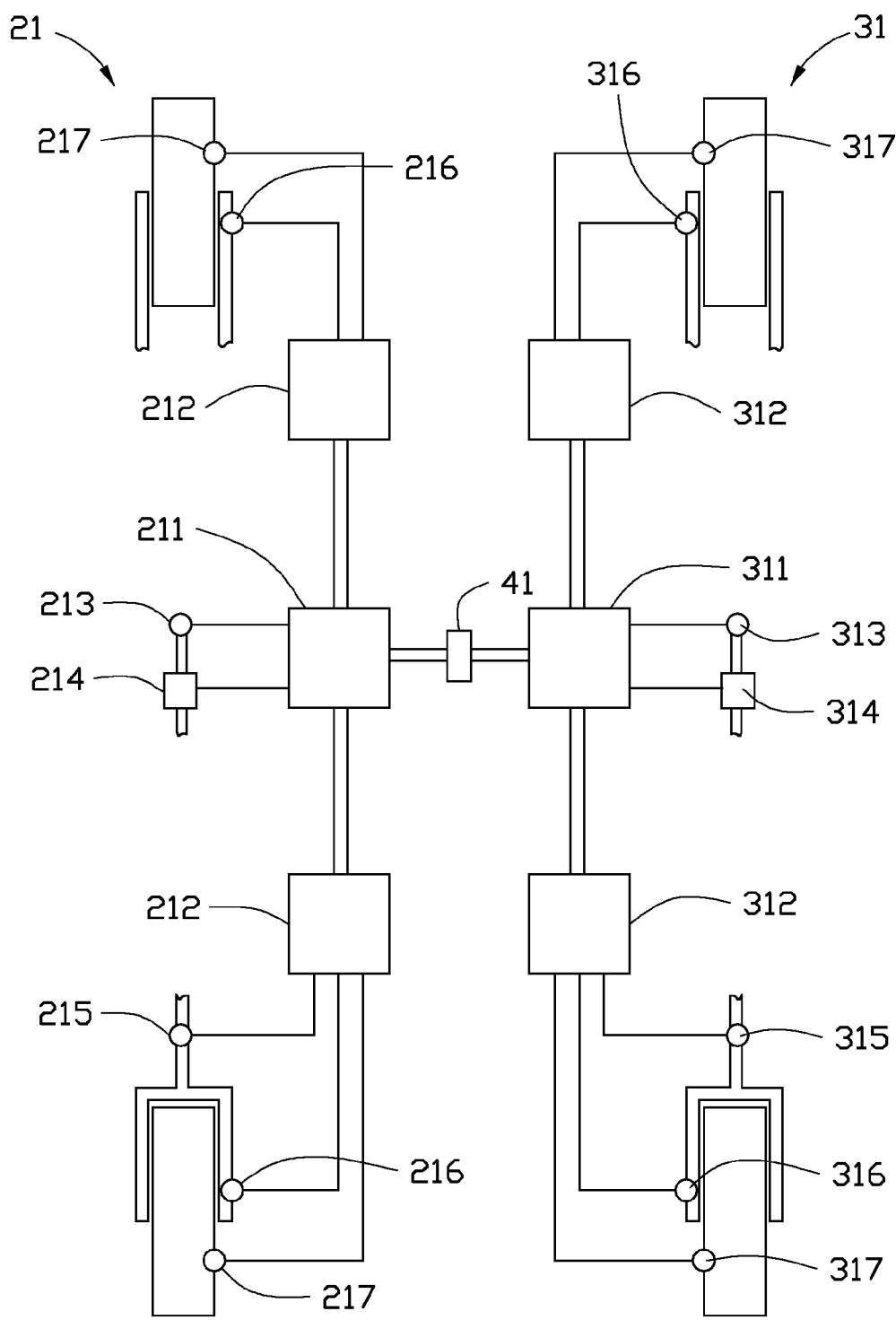
FIG. 5 is a schematic functional block diagram of master and slave electric control units of the sectional electric drive vehicle of FIG. 1.

Referring to FIG. 5, the first motorcycle 20 includes a master electric control unit 21, and the second motorcycle 30 includes a slave electric control unit 31. A system connector 41 detachably connects the master electric control unit 21 and the slave electric control unit 31, to allow signal transmission therebetween, such that the sectional electric drive vehicle 100 can be controlled by drive-by-wire technology.

When the first and second motorcycles 20, 30 are combined or connected together via the connection mechanism 40 and the system connector 41, the slave electric control unit 31 relinquishes control to the master electric control unit 21, which then controls the cooperative motion of the first and second motorcycles 20, 30. When the first and second motorcycles 20, 30 are detached, independent operation thereof is available via the master and slave electric control units 21, 31, respectively.

The master electric control unit 21 includes a first main control unit 211, two first electric control units 212 controlling front and rear wheels of the first motorcycle 20, respectively, a first actuator 214 driving the rear wheel of the first motorcycle 20, a first turn detector 213, a first rotation detector 215, two first braking detectors 216 and two first tire consumption detectors 217 for the front and rear wheels of the first motorcycle 20, respectively. The first electric control units 212, the first turn detector 213, and the first actuator 214 are connected to the first main control unit 211. The first rotation detector 215, the first braking detectors 216, and the first tire consumption detectors 217 are connected to the first electric control unit 212.

The slave electric control unit 31 is similar to the master electric control unit 21, and includes a second main control unit 311, two second electric control units 312 for the front and rear wheels of the second motorcycle 30, respectively, a second turn detector 313, a second actuator 314 driving the rear wheel of the second motorcycle 30, a second rotation detectors 315, two second braking detectors 316, and two second tire consumption detectors 317 for the front and rear wheels of the second motorcycle 30, respectively. The second electric control units 312, the second turn detector 313, and the second actuator 314 are connected to the second main control unit 311. The second rotation detector 315, the second braking detectors 316, and the second tire consumption detectors 317 are connected to the second electric control unit 312. The first main control unit 211 and the second main control unit 311 are detachably connected via the system connector 41.

When the first and second motorcycles 20, 30 are combined together via the connection mechanism 40 and the system connector 41, the slave electric control unit 31 relinquishes control to the master electric control unit 21. The controls of the second motorcycle 30 can be covered or hidden, thus avoiding mishandling thereof.

During operation of the sectional electric drive vehicle 100, the operating status of the first motorcycle 20 detected by the first turn detector 213, the first rotation detector 215, the first braking detectors 216, and the first tire consumption detectors 217 is transmitted to the first main control unit 211, and the operating status of the second motorcycle 30 detected by the second turn detector 313, the second rotation detector 315, the second braking detectors 316, and the second tire consumption detectors 317 is also transmitted to the first main control unit 211 via the system connector 41.

The first main control unit 211 generates a plurality of instructions to control the cooperative motion of the first and second motorcycles 20, 30 based on the already detected operating status of the first and second motorcycles 20, 30 and the driving operations of steering, braking, and the like, of the first motorcycle 20.

In the first embodiment, the sectional electric drive vehicle 100 is driven by the first and second actuators 214, 314. In other embodiments, the sectional electric drive vehicle can be driven only by the first actuator 214 or the second actuator 314.

Figure 6:
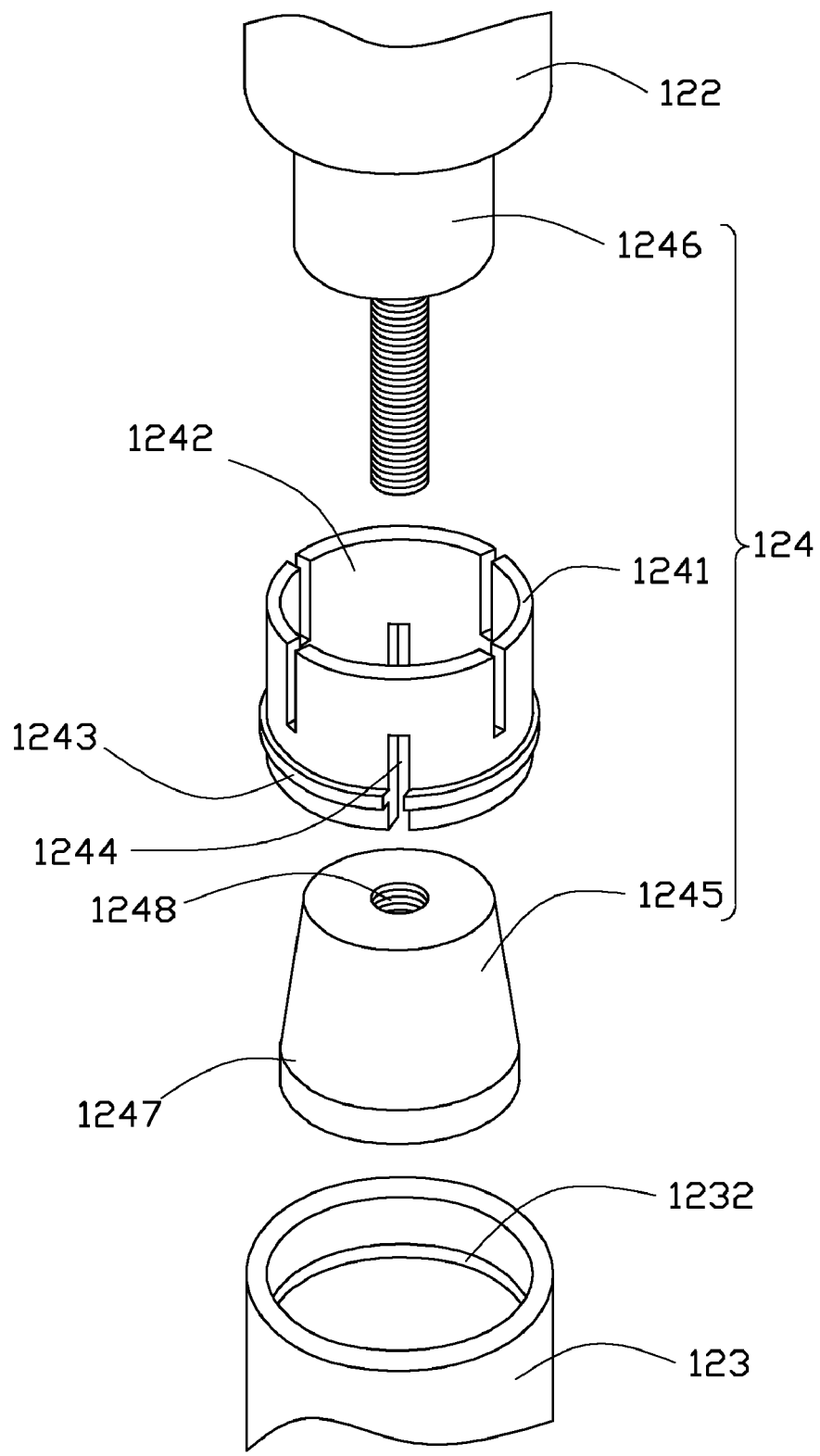
FIG. 6 is a partial, isometric view of a connection mechanism of a second embodiment of a sectional electric drive vehicle.

Referring to FIG. 6, a partial, exploded view of a connection mechanism of a second embodiment of the sectional electric drive vehicle is shown. The second embodiment differs from the first embodiment only in that the locking assembly 124 includes a first connection member 1241, a second connection member 1245, and a threaded member 1246. The threaded member 1246 is fixed to the first bar 122. The first connection member 1241 is a sleeve provided with a tapered hole 1242 in a center extending along a longitudinal axis thereof. The outer surface of the first connection member 1241 forms a latching projection 1243 extending radially. The latching projection 1243 is adjacent to the bottom end of the first connection member 1241. The first connection member 1241 further defines a plurality of slots 1244 extending from opposite ends along a longitudinal axis thereof to allow elastic deformation thereof. The second connection member 1245 forms a tapered protrusion 1247, corresponding to the tapered hole 1242, and defines a threaded hole 1248 corresponding to the threaded member 1246. The second bar 123 defines a latching groove 1232 in the inner surface.

During assembly of the locking assembly 124, the second connection member 1245 is positioned in the second bar 123. The first connection member 1241 is inserted into the second bar 123. Since the slots 1244 provide deformation capability, the first connection member 1241 can generate elastic deformation as the first connection member 1241 biases the second bar 123 until the latching projection 1243 is received in the latching groove 1232. The threaded member 1246 passes through the first connection member 1241 and is threaded into the threaded hole 1248 of the second connection member 1245. The second connection member 1245 moves along the longitudinal axis when drawn by the threaded member 1246, thus enlarging the first connection member 1241 to enable the first connection member 1241 to snugly attach to the inner surface of the second bar 123.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A sectional electric drive vehicle, comprising:
a first motorcycle comprising a master electric control unit;
a connection mechanism;
a second motorcycle comprising a slave electric control unit, and detachably connected to the first motorcycle side by side by the connection mechanism; and
a system connector detachably connecting the master electric control unit and the slave electric control unit for allowing signal transmission between the master and slave electric control units;
wherein when the first and second motorcycles are combined together via the connection mechanism and the system connector, the slave electric control unit relinquishes control to the master electric control unit, and the master electric control unit controls a cooperative motion of the first and second motorcycles; when the first and second motorcycles are detached, the first and second motorcycles are independently operable.

2. The sectional electric drive vehicle of claim 1, wherein the connection mechanism comprises a front beam and a rear beam in parallel, positioned between and detachably connecting the first and second motorcycles.

3. The sectional electric drive vehicle of claim 2, wherein at least one of the front and rear beams comprises a first bar connected to the first motorcycle, a second bar connected to the second motorcycle, and a locking assembly detachably connecting the first and second bars.

4. The sectional electric drive vehicle of claim 3, wherein the locking assembly comprises a first connection member fixed to the first bar and the first connection member defining a tapered hole in a longitudinal axis, a second connection member fixed to the second bar and forms a tapered protrusion received in the tapered hole, and a bolt of the locking assembly passing through the first connection member and threaded into the second connection member.

5. The sectional electric drive vehicle of claim 4, wherein the first connection member defines a plurality of slots extending from an end along a longitudinal axis thereof to allow elastic deformation of the first connection member.

6. The sectional electric drive vehicle of claim 3, wherein the locking assembly comprises a first connection member having a latching projection extending radially from an outer surface of the first connection member and a tapered hole extending along a longitudinal axis, a second connection member comprising a tapered protrusion received in the tapered hole, and a bolt of the locking assembly connected to the first bar, wherein the second bar defines a latching groove in an inner surface thereof in which the latching projection is received, and the bolt of the locking assembly passes through the first connection member and is threaded into the second connection member.

7. The sectional electric drive vehicle of claim 6, wherein the first connection member defines a plurality of slots extending from at least one end along a longitudinal axis thereof to allow elastic deformation of the first connection member.

8. The sectional electric drive vehicle of claim 2, further comprising a left beam and a right beam in parallel, the left beam and the right beam connected to the front and rear beams, the front beam, the rear beam, the left beam, and the right beam cooperatively forming a chassis base.

9. The sectional electric drive vehicle of claim 8, wherein the left and right beams are substantially perpendicular to the front and rear beams.

10. The sectional electric drive vehicle of claim 8, further comprising a body assembly connected to the chassis base, and a covering assembly supported by the body assembly.

11. The sectional electric drive vehicle of claim 10, wherein the body assembly comprises a plurality of threaded tubes, and a plurality of bolts passing through the threaded tubes to lock the tubes together.

12. The sectional electric drive vehicle of claim 10, wherein the covering assembly and the body assembly are connected by magnetic force.

13. The sectional electric drive vehicle of claim 12, wherein the covering assembly comprises a first magnet, the body assembly comprises a second magnet attracted by the first magnet, a plurality of contacting surfaces of the covering assembly and the body assembly cooperatively define a gap therebetween, and a separating member is capable of being received in the gap to obstruct the magnetic field between the first and second magnets.

14. The sectional electric drive vehicle of claim 1, wherein the master electric control unit comprises a first main control unit, two first electric control units for front and rear wheels of the first motorcycle, respectively, a first actuator driving the rear wheel of the first motorcycle, a first turn detector, and two first braking detectors for the front and rear wheels of the first motorcycle, respectively; the first electric control units, the first actuator, and the first turn detector are connected to the first main control unit, and the first braking detectors are connected to the first electric control unit.

15. The sectional electric drive vehicle of claim 14, wherein the master electric control unit further comprises two tire consumption detectors for the front and rear wheels of the first motorcycle.

16. The sectional electric drive vehicle of claim 14, wherein the master electric control unit further comprises a first rotation detector for the front wheel of the first motorcycle, and the first rotation detector is connected to the first electric control unit.

17. The sectional electric drive vehicle of claim 14, wherein the slave electric control unit comprises a second main control unit, two second electric control units for the front and rear wheels of the second motorcycle, respectively, a second actuator driving the rear wheel of the second motorcycle, a second turn detector, and two second braking detectors for the front and rear wheels of the second motorcycle, respectively; the second electric control unit, the second actuator, the second turn detector are connected to the slave electric control unit, and the second braking detectors are connected to the second electric control unit.

18. The sectional electric drive vehicle of claim 16, wherein the slave electric control unit further comprises two second tire consumption detectors for the front and rear wheels of the second motorcycle, respectively.

19. The sectional electric drive vehicle of claim 16, wherein the slave electric control unit further comprises a second rotation detector for the front wheel of the second motorcycle, and the second rotation detector is connected to the second electric control unit.

* * * * *